United States Patent [19]
Deutsch et al.

[11] Patent Number: 6,038,240
[45] Date of Patent: Mar. 14, 2000

[54] METHOD AND SOLID-STATE LASER SYSTEM FOR GENERATING LASER PULSES WITH A VARIABLE PULSE REPETITION FREQUENCY AND CONSTANT BEAM CHARACTERISTICS

[75] Inventors: Nils Deutsch, Göttingen; Thomas Schröder, Jena; Uwe Stamm; Wolfgang Zschocke, both of Göttingen, all of Germany

[73] Assignee: Lambda Physik Gesellschaft zur Herstellung von Lasern mbH, Gottingen, Germany

[21] Appl. No.: 09/008,514

[22] Filed: Jan. 16, 1998

[30] Foreign Application Priority Data

Feb. 12, 1997 [DE] Germany ................ 197 05 330

[51] Int. Cl.[7] .................................................. H01S 3/11
[52] U.S. Cl. ................................ 372/25; 372/10; 372/30
[58] Field of Search .............................. 372/10–17, 25, 372/30

[56] References Cited

U.S. PATENT DOCUMENTS

| | | | |
|---|---|---|---|
| 4,930,901 | 6/1990 | Johnson et al. | 372/26 |
| 5,151,909 | 9/1992 | Davenport et al. | 372/25 X |
| 5,226,051 | 7/1993 | Chan et al. | 372/30 |
| 5,291,505 | 3/1994 | Nielsen | 372/38 |
| 5,721,749 | 2/1998 | Holleman et al. | 372/13 |
| 5,812,569 | 9/1998 | Walker et al. | 372/30 |
| 5,912,912 | 6/1999 | Caprara et al. | 372/25 |

OTHER PUBLICATIONS

Vittorio Magni, "Resonators for solid–state lasers with large–volume fundamental mode and high alignment stability", *Applied Optics*, Jan. 1, 1986, vol. 25, No. 1, pp. 107–117.

D. Golla, S. Knoke, W. Schöne, H. Schmidt, A. Tünnermann, "Mit Diodenlasern transversal angeregte Stablaser Diode laser side–pumped rod lasers", *Laser und optoelektronik*, 1994, vol. 26, No. 3, pp. 76–81, [No Month].

*Primary Examiner*—John D. Lee
*Attorney, Agent, or Firm*—Limbach & Limbach L.L.P.

[57] ABSTRACT

Even in the case of variations in the pulse repetition frequency, a solid-state laser generates laser pulses with constant beam characteristics in such a way that when the pulse repetition frequency of the laser pulses is varied the pulse duty factor of the pumping radiation is kept constant and Q switching is triggered in each case at a prescribed period after the start of the pumping pulse.

10 Claims, 3 Drawing Sheets

METHOD AND SOLID-STATE LASER SYSTEM FOR GENERATING LASER PULSES WITH A VARIABLE PULSE REPETITION FREQUENCY AND CONSTANT BEAM CHARACTERISTICS

The invention relates to a method for generating laser pulses with a variable pulse repetition frequency and constant beam characteristics by means of a Q-switched solid-state laser whose laser medium is pumped in a pulsed fashion by a pumping radiation source. The invention also relates to a corresponding solid-state laser system for generating laser pulses with a variable pulse repetition frequency and constant beam characteristics.

In the case of solid-state lasers pumped in a pulsed fashion, heating of the laser medium by the exciting pumping radiation also effects a generally undesired change in the optical characteristics of the laser. In particular, heating causes a so-called thermal lens in the solid-state laser medium. Particularly in the case of lasers of high average output power, such a thermal lens has a strong influence on the optical characteristics of the laser resonator.

If the thermal lens also changes based on variations in the pulse repetition frequency, the optical characteristics changed thereby also effect a change in the laser resonator and thus there is also a change in the characteristics (parameters) of the output laser radiation pulses. The consequence of this is that given variations in the pulse repetition frequency of the laser radiation pulses it was also possible in the prior art for a change to occur in the characteristics (parameters) of the output laser radiation pulses. When it was desired in the prior art to generate laser radiation pulses with beam characteristics as constant as possible, it was necessary to operate the laser only with a specific fixed pulse repetition frequency. At this fixed (invariable) repetition frequency, the laser resonator then has a specific, constant thermal lens with specific fixed focal lengths which do not change given a fixed mean optical excitation power of the laser medium.

In the prior art, there are attempts to use a special configuration of the laser resonator to compensate, at least in a small range, changes in the thermal lens (in particular changes in the focal lengths of the thermal lens) as a consequence of, for example, changes in repetition frequency or changes in pumping power, without substantial changes occurring in the beam quality (so-called dynamically stable resonators, compare V. N. Magni, Appl. Opt. 25, 107, 1986). However, it is possible to apply this known method only in a very limited fashion, in particular in a narrowly limited range of variations in pulse repetition frequencies.

It is an object of the invention to configure the method mentioned at the beginning and the solid-state laser system such that it is possible to use simple means, in particular with regard to the laser resonator, to generate laser pulses with a pulse repetition frequency which is variable within wide ranges, and with constant beam characteristics.

This aim is achieved according to the invention by means of a method in accordance with claim 1 and of a solid-state laser system in accordance with claim 6.

According to the invention, this aim is achieved, in particular, by virtue of the fact that in the case of variations in the pulse repetition frequency of the laser pulses the pulse duty factor of the pumping radiation is kept constant and the Q switching is triggered in each case at a prescribed period after the start of the pumping pulse.

It is to be observed in a multiplicity of solid-state lasers that whenever the pulse repetition frequency of the pumping radiation exceeds a few tens of Hz, the thermal lens is determined by the average power of the radiation irradiated into the laser medium in a pulsed Fashion. That is, to say the thermal lens no longer appears and disappears with each individual pulse of the pumping radiation, but remains essentially in a steady state. This is caused by the relatively slow temperature relaxation in the solid-state laser medium.

Laser diodes are particularly suitable as pumping radiation source for solid-state lasers. Another preferred pumping radiation source for solid-state lasers are so-called flash lamps.

The effect described above of an essentially constant thermal lens above a determined pulse repetition frequency of the pumping radiation occurs both in the case of lasers pumped by diodes and in the case of lasers pumped by flash lamps.

The invention permits the pulse repetition frequency to be changed in the case of a Q-switched solid-state laser, in particular of a solid-state laser pumped by diodes, without there being substantial changes to the characteristics of the radiation, that is to say, in particular, spatial and temporal profiles of the radiation, the pulse duration and the pulse energy.

According to a preferred development of the invention, an expansion of the range in which the pulse repetition frequency of the laser radiation can be varied is achieved by virtue of the fact that the Q switching is triggered periodically only for a selected proportion of the pumping pulses, in particular at each $2^n$th pumping pulse.

In brief, the invention concerns pumping a solid-state laser with laser diodes such that when the pulse repetition frequency of the laser pulses changes the pumping radiation pulses are controlled such that the optical power irradiated into the solid-state laser medium is such that the thermal lens remains essentially unchanged for all adjusted pulse repetition frequencies such that the optical characteristics of the resonator do not change, with the result that the characteristics of the output laser radiation pulses remain essentially the same at all adjusted pulse repetition frequencies (repetition rates).

An exemplary embodiment of the invention is explained in more detail below with the aid of the drawings, in which.

Figure 1:
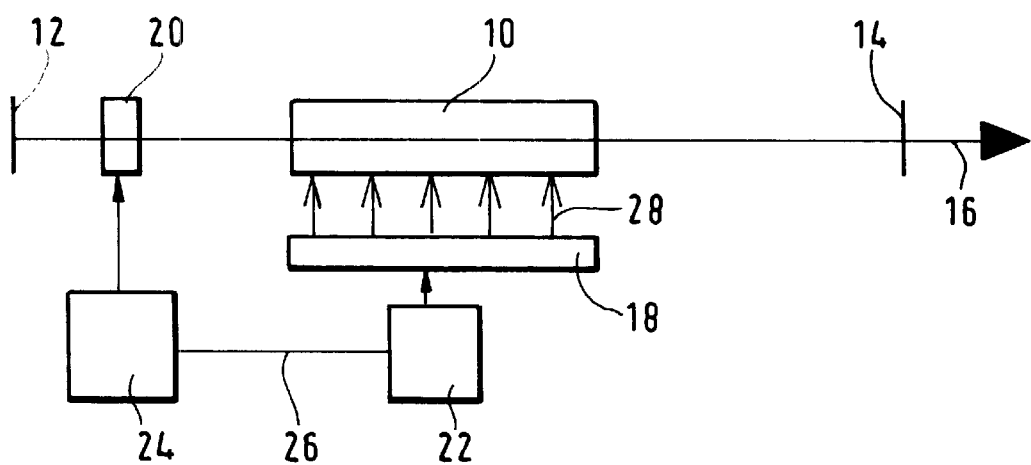
FIG. 1 shows a diagram of a Q-switched solid-state laser pumped by a diode.

FIG. 1 shows diagrammatically a solid-state laser with a solid-state laser medium 10. This can be a neodymium-YAG laser, for example. The laser resonator is formed in the usual way by a back mirror 12 and an output mirror 14. The pulsed laser radiation emerging from the resonator is indicated by reference numeral 16. The laser has a pumping radiation source 18 in the form of laser diodes. The laser diodes output pulsed pumping radiation 28 which is irradiated into the solid-state laser medium 10 in order to pump the latter. A Q switch 20 is arranged in the laser resonator in a way known per se. Q switching is used for the purpose of generating short laser pulses with large peak power. The laser is prevented, by means of the Q switch, from starting to oscillate until the population inversion produced by the pumping process is far above a value prescribed by a threshold condition. Only upon actuation of the Q switch does the latter release the beam path (that is to say it controls the quality of the optical resonator), with the result that the laser can start to oscillate, and the energy stored in the active medium 10 is output in a short and intensive laser pulse. Typically, the duration of these short intensive laser pulses is in the range of a few nanoseconds (for example 10 to 150 ns in round figures).

The time sequence of the pumping radiation pulses 28 and the time sequence of the actuation of the Q switch 20 are controlled by controllers 22 and 24, respectively. In this case, two controllers are coupled to one another, which is indicated by the line 26. This coupling means that the controller 24 of the Q switch 20 operates as a function of the time sequence of the controller 22 of the pumping radiation pulses 28, as is described in more detail further below.

If, in particular, laser diodes are used as the pumping radiation source 18, it is possible for the mean thermal loading of the laser medium 10 (and thus the generation of a thermal lens) to be kept constant in the pulse-shaped excitation of the laser medium 10 even if the pulse repetition frequency of the solid-state laser is changed. The invention is based on this consideration. To be precise, if, despite a variation (change) in the pulse repetition frequency with respect to the laser radiation 16, the thermal loading of the laser medium remains constant, there is also no change in the thermal lens, with the result that the characteristics of the laser radiation remain unchanged to that extent, thus not being changed by thermal effects.

A pulse train is generally understood to be a periodically repeating sequence of individual pulses, the individual pulses generally being at the same spacing. The pulse repetition frequency (pulse frequency) is the reciprocal of the intervals of the periodic pulse train. The pulse duty factor (duty cycle) is an important parameter of a pulse train composed essentially of rectangular individual pulses. The pulse duty factor is defined as the ratio of pulse duration to interval.

FIGS. 2, 3, 4 and 5 show on identical time scales the characteristics of the pulses 30 of the pumping radiation 28, the time sequence of the actuations of the Q switch and the interval which yields the pulse repetition frequency of the laser.

Figure 2:
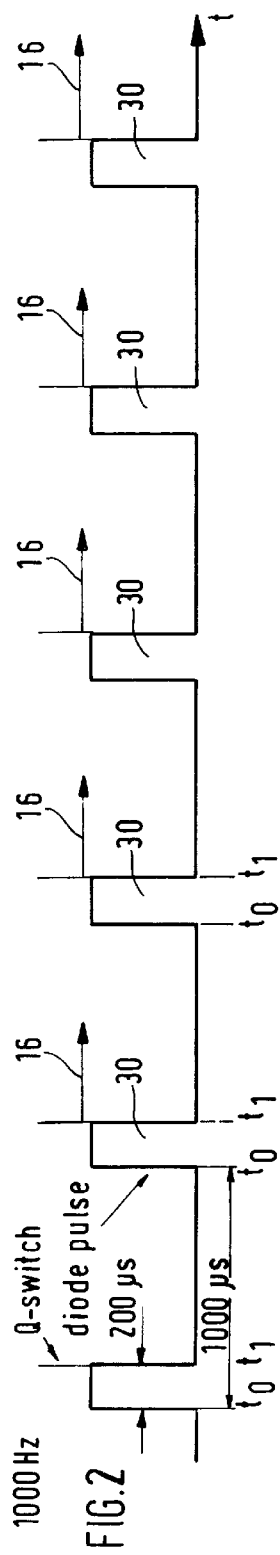
FIGS. 2 to 5 show over a common time scale various exemplary embodiments for the temporal sequences of pumping radiation pulses, laser radiation pulses and actuations of the Q switch.

FIG. 2 shows, for example, a pulse repetition frequency for the laser radiation of 1000 Hz, that is to say an interval of 1000 $\mu$s. The pulse 30, which is output by the pumping radiation source 18 starts at time $t_0$ (FIG. 1, pumping radiation 28). In FIG. 2, the pumping pulse 30 has a duration of 200 $\mu$s. At instant $t_1$, 200 $\mu$s after time $t_0$, the Q switch 20 is switched and the solid-state laser outputs a so-called giant pulse. The giant pulse is output at instant $t_1$ and has a duration which is so short that it cannot be represented in more detail on the time scale in accordance with FIGS. 2 to 5. The "giant pulse" of the laser radiation 16 is denoted in each case in FIGS. 2 to 5 by the vertical stroke at time $t_1$. The giant pulse has a duration in the ns range and is indicated symbolically by the arrow 16 in FIGS. 2 to 6.

Figure 3:
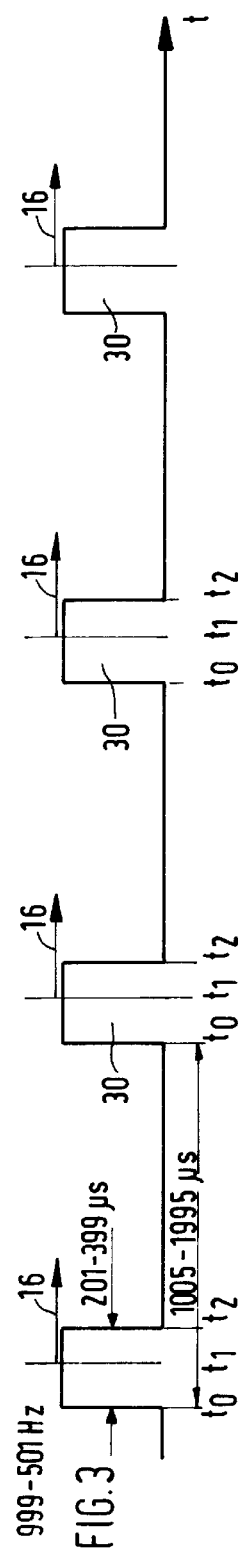

FIG. 3 shows how, starting from the maximum pulse repetition frequency of 1000 Hz in accordance with FIG. 2, the pulse repetition frequency is reduced in steps as far as approximately half the pulse repetition frequency (501 Hz). In this process, the pulse repetition frequency of the laser diodes is reduced continuously in conjunction with a mean optical pumping power which is kept constant. The pulse duration $t_0$ to $t_2$ of the pumping pulses 30 is varied in this case, likewise in steps, in such a way that the mean optical pumping power does not change even given variations in the pulse repetition frequency. When the pulse repetition frequency changes from 999 Hz to 501 Hz, that is to say in the exemplary embodiment in accordance with FIG. 3, the period of the pumping pulses 30 is lengthened from 201 $\mu$s to 399 $\mu$s. However, in all the pulse repetition frequencies in accordance with FIG. 3 the Q switch 20 is always switched at the same instant, as also in the case of the exemplary embodiment in accordance with FIG. 2, specifically at the instant $t_1$, that is to say 200 $\mu$s after the instant $t_0$, at which the pumping pulse 30 began. This maintaining of a constant period between the start of the pumping pulse 30 and the instant of the actuation of the Q switch 20 produces a constant energy, independent of the pulse repetition frequency, of the laser pulses 16 generated by Q switching, since the same pumping energy is always available for the laser pulses 16.

Because the average optical power with which the solid-state laser medium 10 is pumped is, as described, kept constant, the thermally conditioned characteristics of the laser medium 10 are also kept constant despite variations in the pulse repetition frequency, and the laser resonator can be tuned very effectively to a fixed thermal lens of the laser medium. FIG. 3 also shows the variation in the pulse duration from 1005 to 1995 $\mu$s in the case of a reduction in the pulse repetition frequency from 999 to 501 Hz. As mentioned, the pulse duty factor remains constant in the process (0.2).

Figure 4:
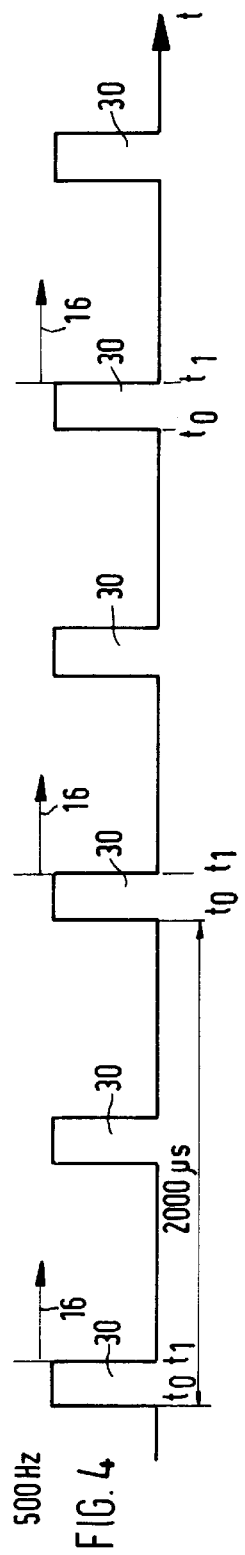

FIG. 4 shows how the method can be extended to even lower pulse repetition frequencies.

FIG. 4 shows the conditions for a pulse repetition frequency of 500 Hz. The Q switch 20 is now, however, switched only at each second pumping pulse 30. As FIG. 4 shows, the average optical power which is pumped into the laser medium 10 is unchanged by comparison with FIGS. 2 and 3, for which reason the thermal lens also remains unchanged and the laser pulses 16 have the same characteristics as the laser pulses in the examples in accordance with FIGS. 2 and 3.

Figure 5:
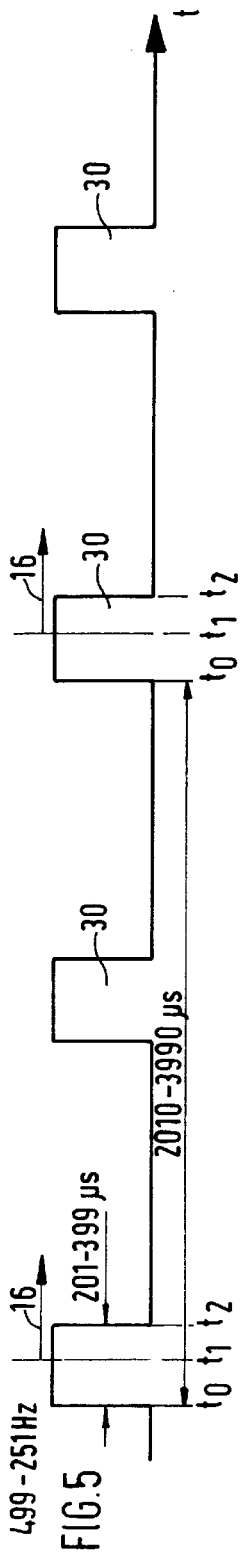

FIG. 5 is similar to FIG. 3, but in this case refers to the circuit of the Q switch 20 at each second pumping pulse 30. FIG. 5 shows the change in the pulse repetition frequency from 499 Hz to 251 Hz, together with a variation in the duration of the pumping pulses 30 from 201 $\mu$s to 399 $\mu$s and corresponding to a change in the interval from 2010 $\mu$s to 3990 $\mu$s.

This method can be refined in such a way that the Q switch 20 is actuated only at each $2^n$th pumping pulse, n being a natural number greater than 0. This method is limited only by the characteristics of the pumping radiation source 18, which is operated in a pulsed fashion and is in the form of high power laser diodes. High power laser diodes currently available can be operated only up to a specific maximum ratio of pulse duration to interval and only up to a specific maximum pulse duration, but this changes nothing in the principle previously explained.

Figure 6:
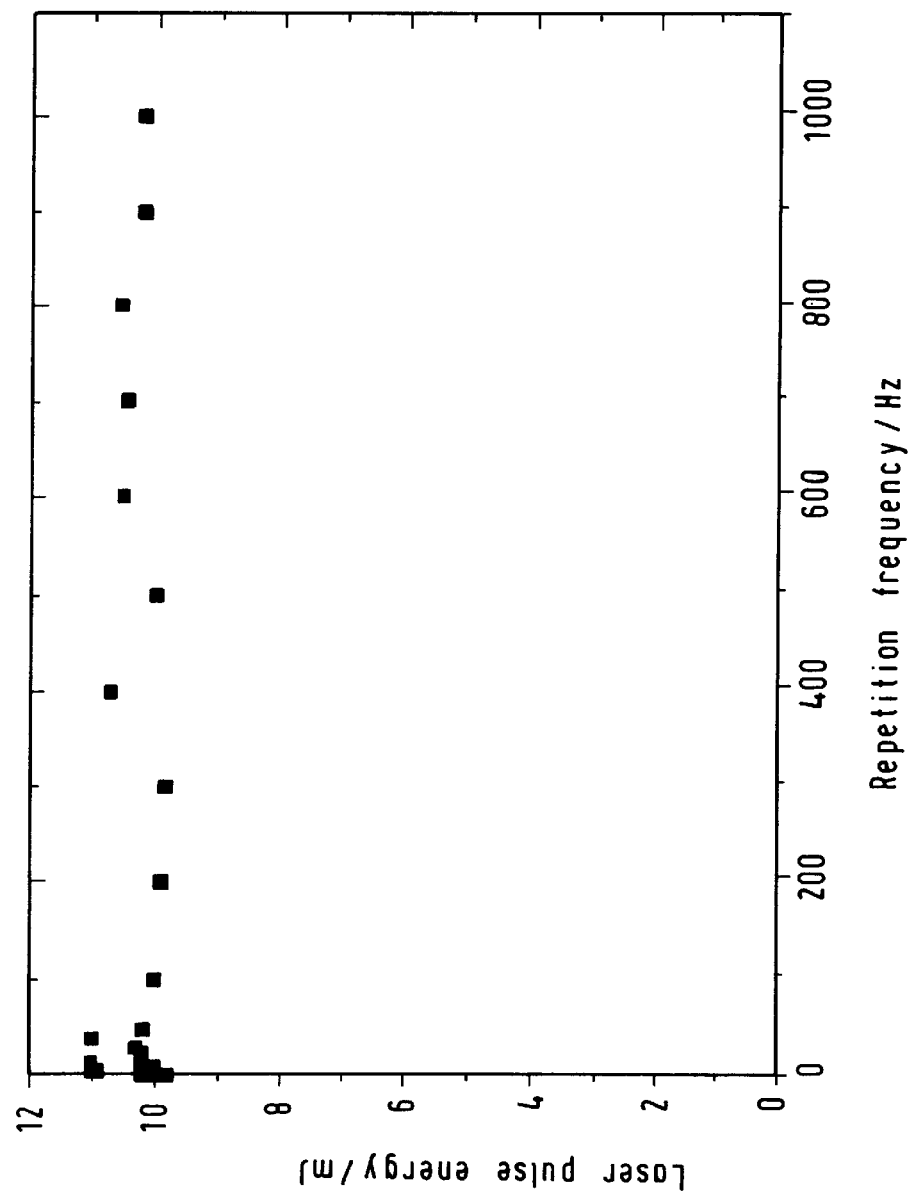
FIG. 6 shows experimental results achieved with the method and solid-state laser system according to the invention in the case of variations in the pulse repetition frequency of the laser radiation.

FIG. 6 shows measurement results with the method described above for operating a solid-state laser. The pulse repetition frequencies are plotted on the abscissa in Hz, specifically a variation over almost three orders of magnitude. The energy of each individual laser pulse is plotted in mJ on the ordinate. The measurement results show a substantial constancy of the laser pulse energy despite variations in the pulse repetition frequency. Further beam characteristics, in particular those which can be influenced by the thermal lens, also remain constant as far as possible.

What is claimed is:

1. A method of operating a Q-switched solid-state laser whose laser medium is pumped in a pulsed fashion by a pumping source to generate laser output pulses, said method allowing the repetition frequency of the laser output pulses to be varied while maintaining constant energy laser output pulses and a substantially constant and predetermined thermal load on the laser medium, comprising the steps of:

selecting a laser output pulse repetition frequency;

setting the frequency and duration of the pumping pulses to maintain a predetermined pulse duty factor to thereby maintain a predetermined thermal load on the laser medium independent of the selected pulse repetition frequency; and actuating the Q-switch at a repetition frequency selected to generate laser output pulses at the selected pulse repetition frequency and wherein the actuation of the Q-switch occurs at a predetermined period $(t_1-t_0)$ after the start $(t_0)$ of a pumping pulse so that the energy per laser output pulse remains constant.

2. A method according to claim 1, wherein the predetermined period $(t_1-t_0)$ is independent of the selected pulse repetition frequency.

3. A method according to any of claims 1 or 2, wherein the actuation of the Q-switch is carried out periodically only for a selected proportion of the pumping pulses.

4. A method according to claim 3, wherein the Q switching is actuated at each $2^n$th pumping pulse.

5. A method according to claim 1, wherein said pumping source comprises at least one diode laser.

6. A Q-switched solid-state laser system for generating laser pulses with a variable pulse repetition frequency and constant beam characteristics, comprising:

laser medium;

a pumping source which periodically pumps the laser medium with pumping pulses;

a Q switch in the solid-state laser; and one or more controllers for setting the frequency and duration of the pumping pulses to maintain a predetermined pulse duty factor to thereby maintain a predetermined thermal load on the laser medium independent of the selected pulse repetition frequency, and for actuating the Q-switch at a repetition frequency selected to generate laser output pulses at a selected pulse repetition frequency, and wherein the actuation of the Q-switch occurs at a predetermined period $(t_1-t_0)$ after the start $(t_0)$ of a pumping pulse so that the energy per laser output pulse remains constant.

7. A Q-switched solid-state laser system according to claim 6, wherein the predetermined period $(t_1-t_0)$ is independent of the selected pulse repetition frequency.

8. A solid-state laser system according to any of claims 6 or 7, wherein one of said one or more controllers periodically actuates the Q switch only for a selected proportion of the pumping pulses.

9. A solid-state laser system according to claim 8, wherein said one of said one or more controllers actuates the Q switch at each $2^n$th pumping pulse.

10. A solid-state laser system according to claim 6, wherein said pumping source comprises at least one diode laser.

* * * * *